United States Patent [19]

Nakagawa et al.

[11] Patent Number: 4,828,923

[45] Date of Patent: May 9, 1989

[54] RUBBER LAMINATES OF FLUORORUBBER AND NITRILE RUBBER

[75] Inventors: Takashi Nakagawa; Osamu Sugimoto, both of Kawasaki, Japan

[73] Assignee: Nippon Zeon Co., Ltd., Tokyo, Japan

[21] Appl. No.: 178,394

[22] Filed: Apr. 6, 1988

[30] Foreign Application Priority Data

Apr. 10, 1987 [JP] Japan .................................. 62-88218
Jun. 22, 1987 [JP] Japan ................................. 62-154982

[51] Int. Cl.$^4$ ........................ B32B 25/04; B32B 25/14
[52] U.S. Cl. ..................................... 428/422; 428/421; 525/326.3; 525/340; 525/194
[58] Field of Search ................ 428/422; 525/340, 199, 525/194, 196

[56] References Cited

U.S. PATENT DOCUMENTS

| | | | |
|---|---|---|---|
| 4,048,261 | 9/1917 | Starmer | 525/199 |
| 4,361,608 | 11/1982 | Furukawa et al. | 428/422 |
| 4,489,196 | 12/1984 | Schmiegel | 525/326.3 |
| 4,544,708 | 10/1985 | Moggi et al. | 525/340 |
| 4,600,651 | 7/1986 | Aufdermarsh et al. | 428/422 |
| 4,606,952 | 8/1986 | Sugimoto et al. | 428/422 |
| 4,614,779 | 9/1986 | Watanabe et al. | 525/199 |
| 4,742,126 | 5/1988 | Moggi et al. | 525/340 |
| 4,748,208 | 5/1988 | Kassahara et al. | 525/340 |

FOREIGN PATENT DOCUMENTS 57-200437 12/1982 Japan .................................. 525/340

Primary Examiner—Carman J. Seccuro
Attorney, Agent, or Firm—Armstrong, Nikaido, Marmelstein & Kubovcik

[57] ABSTRACT

Disclosed is a process for the preparation of rubber laminates. According to this process, a rubber laminate having a high bonding strength can be obtained by contacting an uncured composition A comprising a fluororubber and a metal oxide with an uncured composition B comprising a nitrile group-containing polymer rubber and a phosphonium salt represented by the following general formula:

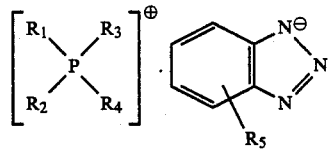

wherein $R_1$, $R_2$, $R_3$ and $R_4$ each stand for a hydrocarbon residue having 1 to 20 carbon atoms, which may be substituted, with the proviso that up to three of $R_1$, $R_2$, $R_3$ and $R_4$ may be a primary, secondary or tertiary amino group or a fluoroalkyl group, and $R_5$ stands for a hydrogen atom or an alkyl group having 1 to 20 carbon atoms, and curing the uncured compositions.

12 Claims, No Drawings

RUBBER LAMINATES OF FLUORORUBBER AND NITRILE RUBBER

BACKGROUND OF THE INVENTION

The present invention relates to a process for the preparation of rubber laminates. More particularly, the present invention relates to a process for the preparation of rubber laminates, which comprises contacting a fluororubber containing specific compounding additives with a nitrile group-containing polymer rubber and bonding them by curing.

Recently, an increasing importance is attached to the resistance to alcohol-mixed gasoline and sour gasoline as the characteristics required of fuel hoses.

A fluororubber is excellent in the resistance to heat, oil, solvent and chemicals, and is used as a rubber excellent in the resistance to alcohol-mixed gasoline and sour gasoline.

Although the fluororubber has these excellent properties, it is more expensive than other rubbery materials such as an acrylonitrile/butadiene rubber, an epichlorohydrin rubber and a nitrile group-containing, highly saturated polymer and is defective in that the cold resistance is poor.

Accordingly, a material formed by laminating a layer of a fluororubber composition having the above-mentioned excellent characteristics on a layer of an ordinary rubber composition attracts attention. However, the fluororubber can not be bonded by curing to other rubber according to customary procedures, or the bonding force is very weak. Therefore, any laminate having a high bonding strength has not been obtained.

As the means for improving the curing bonding force to a fluororubber, there have been proposed a process in which a metal oxide and a silica filler and/or an epoxy resin are incorporated in an acrylonitrile/ butadiene rubber (see Japanese Patent Application Kokai Publication No. 56-53066) and a process in which a 1,8-diazabicyclo[5,4,0]undecene-7 salt of a carboxylic acid is further incorporated (see Japanese Patent Application Kokai Publication No. 58-162335).

According to these processes, however, it is impossible to bond the fluororubber firmly to the nitrile group-containing polymer rubber by curing, and no perfect technique has been developed.

SUMMARY OF THE INVENTION

It is a primary object of the present invention to overcome the above-mentioned defects of the conventional techniques and provide a process for preparing a rubber laminate having a strong bonding force by cure-bonding a fluororubber with a nitrile group-containing polymer rubber.

In accordance with the present invention, this object can be attained by contacting an uncured composition comprising a fluororubber and a metal oxide (hereinafter referred to as "uncured composition A") with an uncured composition comprising a nitrile group-containing polymer rubber and a phosphonium salt represented by the following general formula (hereinafter referred to as "uncured composition B"), and curing the uncured compositions A and B:

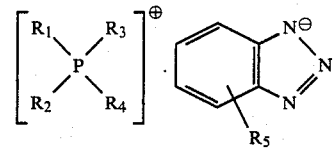

wherein $R_1$, $R_2$, $R_3$ and $R_4$ each stand for a hydrocarbon residue having 1 to 20 carbon atoms, which may be substituted, with the proviso that up to three of $R_1$, $R_2$, $R_3$ and $R_4$ may be a primary, secondary or tertiary amino group or a fluoroalkyl group, and $R_5$ stands for a hydrogen atom or an alkyl group having 1 to 20 carbon atoms.

DETAILED DESCRIPTION OF THE PREFERRED EMBODIMENTS

As the fluororubber used for the uncured composition A in the present invention, there can be mentioned homopolymer rubbers of fluorine-containing unsaturated monomers such as vinylidene fluoride, hexafluoropropene, tetrafluoroethylene, pentafluoropropene, trifluoroethylene, trifluorochloroethylene, vinyl fluoride, perfluoromethyl vinyl ether and perfluoroethyl vinyl ether, copolymer rubbers of these monomers and copolymer rubbers of these monomers with other copolymerizable monomers such as olefins, for example, ethylene and propylene.

A vinylidene fluoride/hexafluoropropene binary copolymer rubber and a vinylidene fluoride/hexafluoropropene/tetrafluoroethylene terpolymer rubber are especially preferred as the fluororubber.

CaO, MgO, PbO, $Pb_3O_4$, BaO and $Al_2O_3$ can be used as the metal oxide in the uncured composition A. MgO is especially preferred.

The metal oxide is incorporated in an amount of 1 to 30 parts by weight per 100 parts by weight of the fluororubber, and the amount of the metal oxide is appropriately determined according to the composition of the fluororubber and the kind of the compounding additive to be incorporated into the fluororubber.

Unsaturated nitrile/conjugated diene copolymer rubbers, unsaturated nitrile/conjugated diene/ ethylenically unsaturated monomer terpolymer rubbers and unsaturated nitrile/ethylenically unsaturated copolymer rubbers can be used as the nitrile group-containing polymer rubber of the uncured composition B in the present invention.

In the unsaturated nitrile/ethylenically unsaturated monomer copolymer rubber, a part of the ethylenically unsaturated monomer may be replaced by a non-conjugated diene such as vinylnorbornene, dicyclopentadiene or 1,4-hexadiene.

As specific examples of the nitrile group-containing polymer rubber, there can be mentioned a butadiene/acrylonitrile copolymer rubber, an isoprene/butadiene/acrylonitrile copolymer rubber, an isoprene/acrylonitrile copolymer rubber, a butadiene/methyl acrylate/acrylonitrile copolymer rubber, a butadiene/acrylic acid/acrylonitrile copolymer rubber, a butadiene/ethylene/acrylonitrile copolymer rubber, a butyl acrylate/ethoxyethyl acrylate/vinyl chloroacetate/ acrylonitrile copolymer rubber and a butyl acrylate/ ethoxyethyl acrylate/vinylnorbornene/acrylonitrile copolymer rubber.

In the case where a highly saturated rubber having an iodine value smaller than 120 is used as the nitrile group-containing polymer rubber, the effect of improving the heat resistance and the resistance to sour fuel oil in the rubber laminate is especially enhanced. As the highly saturated rubber, there can be mentioned a copolymer rubber obtained by hydrogenating conjugated diene units of an unsaturated nitrile/conjugated diene copolymer rubber, an unsaturated nitrile/conjugated diene/ethylenically unsaturated terpolymer rubber, a copolymer rubber obtained by hydrogenating conjugated diene units of this terpolymer rubber, and an unsaturated nitrile/ethylenically unsaturated monomer copolymer rubber. In the unsaturated nitrile/ethylenically unsaturated monomer copolymer rubber, a part of the ethylenically unsaturated monomer may be replaced by a non-conjugated diene such as vinylnorbornene, ducylopentadiene or 1,4-hexadiene.

As specific examples of the highly saturated rubber, there can be mentioned copolymer rubbers obtained by hydrogenating a butadiene/acrylonitrile copolymer rubber, an isoprene/butadiene/acrylonitrile copolymer rubber and an isoprene/acrylonitrile copolymer rubber, a butadiene/methyl acrylate/acrylonitrile copolymer rubber, a butadiene/acrylic acid/acrylonitrile copolymer rubber and hydrogenation products thereof, and a butadiene/ ethylene/acrylonitrile copolymer rubber, a butyl acrylate/ethoxyethyl acrylate/vinyl chloroacetate/ acrylonitrile copolymer rubber and a butyl acrylate/ ethoxyethyl acrylate/vinynnorbornene/acrylonitrile copolymer rubbers. These polymer rubbers can be prepared according to customary polymerization and hydrogenation procedures.

The phosphonium salt used in the uncured composition B in the present invention is represented by the following general formula:

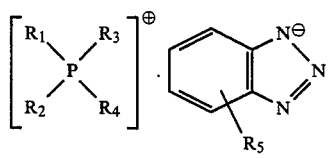

wherein $R_1$, $R_2$, $R_3$ and $R_4$ each stand for a hydrocarbon residue having 1 to 20 carbon atoms, which may be substituted, with the proviso that up to three of $R_1$, $R_2$, $R_3$ and $R_4$ may be a primary, secondary or tertiary amino group or a fluoroalkyl group, and R stands for a hydrogen atom or an alkyl group having 1 to 20 carbon atoms.

As the hydrocarbon residue constituting $R_1$, $R_2$, $R_3$ and $R_4$, there can be mentioned alkyl groups such as methyl, ethyl, butyl, ethylhexyl and dodecyl groups, cycloalkyl groups such as a cyclohexyl group, aralkyl groups such as benzyl and methylbenzyl groups, and aryl and substituted aryl groups such as phenyl, naphthyl and butylphenyl groups. As the secondary and tertiary amino groups, there can be mentioned methylamino, ethylamino, anilino, dimethylamino and diethylamino groups, and as the fluoroalkyl group, there can be mentioned trifluoromethyl, tetrafluoropropyl and octafluoropentyl groups. As the group $R_5$, there can be mentioned alkyl groups such as methyl, ethyl, butyl, ethylhexyl and dodecyl groups.

As specific examples of the phosphonium salt, there can be mentioned tetrabutyl-, tetraoctyl-, methyltrioctyl-, butyltrioctyl-, phenyltributyl-, benzyltributyl-, benzyltricyclohexyl-, benzyltrioctyl-, butyltriphenyl-, tetraphenyl-, diphenyldi(diethylamino)-, phenylbenzyldi(dimethylamino)-, phenylbenzyldi(diethylamino)-, trifluoromethylbenzyl- and tetrafluoropropyltrioctylphosphonium benzotriazolates and tolyltriazolates.

The phosphonium salt is used in an amount of 1 to 10 parts by weight per 100 parts by weight of the nitrile group-containing polymer rubber.

If the amount of the phosphonium salt is smaller than 1 part by weight per 100 parts by weight of the nitrile group-containing polymer rubber, any rubber laminate having a good bonding strength cannot be obtained. If the amount of the phosphonium salt exceeds 10 parts by weight per 100 parts by weight of the nitrile group-containing polymer rubber, the curing speed of the nitrile group-containing polymer rubber is drastically reduced.

The phosphonium salt is added to the nitrile group-containing polymer rubber, as pointed out hereinbefore. Furthermore, the phosphonium salt can also be added to the above-mentioned fluororubber. The phosphonium salt is added to the fluororubber in an amount of up to 10 parts by weight per 100 parts by weight of the fluororubber.

Known compounding additives such as a crosslinking agent, a crosslinking promoter, a reinforcer, for example, carbon black or silica, a filler, a softener, a plasticizer, an antioxidant, a stabilizer and a processing assistant can be incorporated in the uncured rubber compositions A and B according to need.

In the present invention, the uncured compositions A and B are separately kneaded according to a known method and molded into an arbitrary shape, for example, a sheet.

Then, the compositions A and B are contacted with each other in an uncured state, and they are then cured to obtain a rubber laminate. The curing method is not particularly critical. For example, compression curing is carried out by using a hot press or curing can, whereby both the rubber sheets are bonded together simultaneously with curing. Moreover, there can be adopted a method in which a laminate tube is formed by two-layer extrusion of the compositions A and B and the laminate tube is subjected to compression curing by using a curing can.

Hot pressing is ordinarily carried out at a temperature of 140 to 200° C. under a pressure of 20 to 150 kg/cm² for 5 to 60 minutes.

When a curing can is used, compression curing is ordinarily carried out at a temperature of 130 to 160° C. under a pressure of 1.8 to 5.5 kg/cm² for 30° to 120 minutes.

If the obtained laminate is heat-treated (post-cured), the primary curing time can be shortened and the compression set can be improved.

According to the present invention, by contacting the uncured compositions A and B with each other and curing them in this state, a rubber laminate having the cured compositions A and B bonded firmly to each other can be obtained.

Since the cured composition B is laminated on the cured composition A in this rubber laminate, the cost and low-temperature characteristics can be highly improved.

The rubber laminate of the present invention is especially excellent in resistance to gasoline, particularly the resistance to sour gasoline. Accordingly, by utilizing this excellent property, the laminate of the present invention can be used as a hose material for fuel oils and a diaphragm. Moreover, the rubber laminate of the present invention can be used as various rubber parts excellent in oil resistance and chemical resistance.

The present invention will now be described in detail with reference to the following examples.

In the examples and comparative examples, all of "parts" and "%" are by weight, unless otherwise stated.

The iodine value was determined according to the method of JIS K 0070 (ASTM D460).

EXAMPLE 1

Each of an uncured composition B comprising a nitrile group-containing polymer rubber and a phosphonium salt, shown in Table 1, and an uncured composition A shown in Table 2 was kneaded by a 6-inch open roll to form a sheet having a uniform thickness of about 2 mm.

Then, each sheet was cut into a strip having a size of 6 cm×10 cm, and a test piece of a laminate was prepared by laminating a combination of strips shown in Table 3 and curing and bonding the laminate under a pressing pressure of 40 kg/cm² at 170° C. for 15 minutes. Cellophane paper was interposed between the portions to be gripped by a chuck in the peeling test so that both the sheets were not bonded.

Then, the portions between which the cellophane paper was interposed were gripped by the chuck, and the peeling test was carried out at a pulling speed of 50 mm/min to measure the peel strength according to the method of (JIS K 6301).

The obtained results are shown in Table 3.

From the results shown in Table 3, it is evident that the fluororubber is bonded to the nitrile group-containing polymer rubber with a strong bonding force.

TABLE 1

| Recipe (parts by weight) | Sample | | | | | |
| --- | --- | --- | --- | --- | --- | --- |
| | N1 | N2 | N3 | N4 | N5 | N6 |
| acrylonitrile/butadiene copolymer rubber*1 | 100 | 100 | — | — | — | — |
| acrylonitrile/butadiene copolymer rubber*2 | — | — | 100 | 100 | 100 | 100 |
| zinc oxide | 5 | 5 | 5 | 5 | 5 | 5 |
| stearic acid | 1 | 1 | 1 | 1 | 1 | 1 |
| carbon black (FEF) | 70 | 70 | 70 | 70 | 50 | 70 |
| silica (Carplex #1120) | — | — | — | — | 20 | — |
| magnesium oxide | — | — | — | — | 15 | 15 |
| plasticizer (TP-95)*3 | 10 | 10 | 10 | 10 | 10 | 10 |
| tetrabutylphosphonium benzotriazolate | — | 2.0 | — | 2.0 | 2.0 | 2.0 |
| surfur | 0.75 | 0.75 | 0.75 | 0.75 | 0.75 | 0.75 |
| promoter TT*4 | 1.0 | 1.0 | 1.0 | 1.0 | 1.0 | 1.0 |
| promoter CZ*5 | 1.5 | 1.5 | 1.5 | 1.5 | 1.5 | 1.5 |

Notes:
*1Nipol DN-101 (supplied by Nippon Zeon, nitrile content = 42%)
*2Nipol DN-207 (supplied by Nippon Zeon, nitrile content = 33%)
*3di(butoxyethoxyethyl)adipate (supplied by Morton Thiokol Co., Chemical Division, U.S.A.)

TABLE 2

| Recipe (parts by weight) | Sample | | |
| --- | --- | --- | --- |
| | F1 | F2 | F3 |
| fluororubber*1 | 100 | 100 | — |
| fluororubber*2 | — | — | 100 |
| magnesium oxide | 9 | 3 | — |
| calcium hydroxide | — | 6 | — |
| lead oxide | — | — | 15 |
| carbon black (MT) | 20 | 20 | — |

TABLE 2-continued

| Recipe (parts by weight) | Sample | | |
| --- | --- | --- | --- |
| | F1 | F2 | F3 |
| carbon black (HAF) | — | — | 17 |

Notes:
*1Tecnoflon FORSOE (supplied by Montefluos, Italy)
*2Tecnoflon FOR45 (Montefluos, Italy)

TABLE 3

| | Combination of Uncured Compositions | | Peel Strength (kg/inch) |
| --- | --- | --- | --- |
| | B | A | |
| Comparative Example | N1 | F1 | not bonded |
| | N1 | F3 | not bonded |
| | N3 | F1 | not bonded |
| | N3 | F3 | not bonded |
| Example | N2 | F1 | 9.8 |
| | N4 | F1 | 12.4 |
| | N4 | F2 | 8.4 |
| | N4 | F3 | 4.5 |
| | N5 | F1 | 12.0 |
| | N5 | F2 | 8.6 |
| | N5 | F3 | 21.6 |
| | N6 | F1 | 13.0 |
| | N6 | F2 | 9.7 |
| | N6 | F3 | 19.0 |

EXAMPLE 2

According to the same procedures as those described in Example 1, an uncured composition B comprising a nitrile group-containing polymer rubber and a phosphonium salt, shown in Table 4, and a phosphonium salt-containing uncured composition A shown in Table 5 were kneaded and test pieces were prepared therefrom to measure the peel strength.

The obtained results are shown in Table 6. From the results shown in Table 6, it is evident that, when a specific phosphonium salt is incorporated in an amount of at least 1.0 parts by weight in the nitrile group-containing polymer rubber and a metal oxide is incorporated in the fluororubber, a rubber laminate in which the nitrile group-containing polymer rubber is cure-bonded firmly to the fluororubber can be obtained.

TABLE 4

| Recipe (parts by weight) | Sample | | | | |
| --- | --- | --- | --- | --- | --- |
| | N7 | N8 | N9 | N10 | N11 |
| acrylonitrile/butadiene copolymer rubber*1 | 100 | 100 | 100 | 100 | 100 |
| zinc oxide | 5 | 5 | 5 | 5 | 5 |
| stearic acid | 1 | 1 | 1 | 1 | 1 |
| carbon black (FEF) | 70 | 70 | 70 | 70 | 70 |
| plasticizer (TP-95)*2 | 10 | 10 | 10 | 10 | 10 |
| tetrabutylphosphonium benzotriazolate | 0 | 1.0 | 2.0 | 3.0 | 5.0 |
| sulfur | 0.75 | 0.75 | 0.75 | 0.75 | 0.75 |
| promoter TT | 1.0 | 1.0 | 1.0 | 1.0 | 1.0 |
| promoter CZ | 1.5 | 1.5 | 1.5 | 1.5 | 1.5 |

Notes:
*1Nipol DN-207 (supplied by Nippon Zeon)
*2di(butoxyethoxyethyl)adipate (supplied by Morton Thiokol Co., Chemical Division, U.S.A.)

TABLE 5

| Recipe (parts by weight) | Sample | | |
| --- | --- | --- | --- |
| | F4 | F5 | F6 |
| fluororubber*1 | 100 | 100 | 100 |
| magnesium oxide | 3 | 3 | 3 |
| calcium hydroxide | 6 | 6 | 6 |
| TBP-BT*2 | 0 | 0.5 | 1.0 |
| Tecnoflon M1*3 | 3.6 | 3.6 | 3.6 |

TABLE 5-continued

| Recipe (parts by weight) | Sample | | |
|---|---|---|---|
| | F4 | F5 | F6 |
| Tecnoflon M₂*⁴ | 1.6 | 1.6 | 1.6 |

Notes:
*¹Tecnoflon NM (supplied by Montefluos, Italy)
*²tetrabutylphosphonium benzotriazolate
*³bisphenol AF type curing promoter supplied by Montefluos, Italy
*⁴organic phosphate type curing promoter supplied by Montefluos, Italy

TABLE 6

| | Combination of Uncured Compositions | | Peel Strength |
|---|---|---|---|
| | B | A | (kg/inch) |
| Comparative | N7 | F4 | not bonded |
| Example | N7 | F6 | not bonded |
| Example | N8 | F6 | 4.2 |
| | N9 | F4 | 9.8 |
| | N9 | F5 | 8.8 |
| | N9 | F6 | 8.7 |
| | N10 | F4 | 9.2 |
| | N10 | F6 | 9.2 |
| | N11 | F4 | 9.5 |
| | N11 | F6 | 10.5 |

EXAMPLE 3

According to the same procedures as those described in Example 1, an uncured composition B comprising a nitrile group-containing polymer rubber and a phosphonium salt, shown in Table 7, and an uncured composition A shown in Table 8 were kneaded and test pieces were prepared therefrom to measure the peel strength.

The obtained results are shown in Table 9. From the results shown in Table 9, it is evident that, according to the process of the present invention, a rubber laminate in which a nitrile group-containing polymer rubber is firmly bonded to a fluororubber can be obtained.

TABLE 7

| Recipe (parts by weight) | Sample | | | | | |
|---|---|---|---|---|---|---|
| | N12 | N13 | N14 | N15 | N16 | N17 |
| acrylonitrile/butadiene copolymer rubber*¹ | 100 | 100 | 100 | 100 | 100 | 100 |
| zinc oxide | 5 | 5 | 5 | 5 | 5 | 5 |
| stearic acid | 1 | 1 | 1 | 1 | 1 | 1 |
| carbon black (FEF) | 70 | 70 | 70 | 70 | 70 | 70 |
| plasticizer (TP-95)*² | 10 | 10 | 10 | 10 | 10 | 10 |
| sulfur | 0.75 | 0.75 | 0.75 | 0.75 | 0.75 | 0.75 |
| promoter TT | 1.0 | 1.0 | 1.0 | 1.0 | 1.0 | 1.0 |
| promoter CZ | 1.5 | 1.5 | 1.5 | 1.5 | 1.5 | 1.5 |
| tetrabutylphosphonium bromide | 2 | — | — | — | — | — |
| 1,2,3-benzotriazolate | — | 2 | — | — | — | — |
| tetrabutylphosphonium benzotriazolate | — | — | 2 | — | — | — |
| tetrabutylphosphonium tolyltriazolate | — | — | — | 2 | — | — |
| triphenylbenzylphosphonium triazolate | — | — | — | — | 2 | — |
| trioctylethylphosphonium triazolate | — | — | — | — | — | 2 |

Notes:
*¹Nipol DN-207 (supplied by Nippon Zeon)
*²di(butoxyethoxyethyl)adipate (supplied by Morton Thiokol Co.) Chemical Division, U.S.A.

TABLE 8

| Recipe (parts by weight) | Sample F7 |
|---|---|
| fluororubber*¹ | 100 |
| magnesium oxide | 5 |
| calcium hydroxide | 6 |

TABLE 8-continued

| Recipe (parts by weight) | Sample F7 |
|---|---|
| carbon black (MT) | 20 |

Notes:
*¹Tecnoflon FOR 45 (supplied by Montefluos, Italy)

TABLE 9

| | Combination of Uncured Compositions | | Peel Strength |
|---|---|---|---|
| | B | A | (kg/inch) |
| Comparative | N12 | F7 | not bonded |
| Example | N13 | F7 | not bonded |
| Example | N14 | F7 | 9.8 |
| | N15 | F7 | 9.6 |
| | N16 | F7 | 8.2 |
| | N17 | F7 | 7.8 |

EXAMPLE 4

According to the same procedures as those described in Example I, an uncured composition B comprising a nitrile group-containing polymer rubber and a phosphonium salt, shown in Table 10, and an uncured fluororubber composition A shown in Table 11 were kneaded and test pieces were prepared from the combinations shown in Table 12 to measure the peel strength. The obtained results are shown in Table 12.

From the results shown in Table 12, it is evident that, according to the process of the present invention, a fluororubber is laminated with a nitrile group-containing polymer rubber with a strong bonding force.

TABLE 10

| Recipe (parts by weight) | Sample | | | | | |
|---|---|---|---|---|---|---|
| | N18 | N19 | N20 | N21 | N22 | N23 |
| H—NBR*¹ | 100 | 100 | — | — | — | — |
| H—NBR*² | — | — | 100 | 100 | 100 | 100 |
| zinc oxide | 5 | 5 | 5 | 5 | 5 | 5 |
| stearic acid | 1 | 1 | 1 | 1 | 1 | 1 |
| carbon black (FEF) | 40 | 40 | 40 | 40 | 40 | 40 |
| silica (Carplex #1120) | — | — | — | — | 20 | — |
| magnesium oxide | — | — | — | — | 15 | 15 |
| plasticizer (TP-95)*³ | 5 | 5 | 5 | 5 | 5 | 5 |
| tetrabutylphosphonium benzotriazolate | — | 2.0 | — | 2.0 | 2.0 | 2.0 |
| sulfur | 0.5 | 0.5 | 0.5 | 0.5 | 0.5 | 0.5 |
| curing promoter TT | 2.0 | 2.0 | 2.0 | 2.0 | 2.0 | 2.0 |
| curing promoter CZ | 1.0 | 1.0 | 1.0 | 1.0 | 1.0 | 1.0 |

Notes:
*¹Zetpol 1020 (supplied by Nippon Zeon, nitrile content = 4.2%, hydrogenation ratio = 90%, iodine value = 25)
*²Zetpol 2020 (supplied by Nippon Zeon, nitrile content = 38%, hydrogenation ratio = 90%, iodine value = 26)
*³di(butoxyethoxyethyl)adipate (supplied by Morton Thiokol Co., Chemical Division, U.S.A.)

TABLE 11

| Recipe (parts by weight) | Sample F8 |
|---|---|
| fluororubber*¹ | 100 |
| magnesium oxide | 3 |
| calcium hydroxide | 6 |
| carbon black (MT) | 20 |
| Tecnoflon M₁*² | 3.6 |
| Tecnoflon M₂*³ | 1.6 |

Notes:
*¹Tecnoflon NM (supplied by Montefluos, Italy)
*²supplied by Montefluos, Italy
*³supplied by Montefluos, Italy

TABLE 12

| | Combination of Uncured Compositions | | Peel Strength |
|---|---|---|---|
| | B | A | (kg/inch) |
| Comparative Example | N18 | F8 | not bonded |
| | N20 | F8 | not bonded |
| Example | N19 | F8 | 9.3 |
| | N21 | F8 | 8.5 |
| | N22 | F8 | 9.8 |
| | N23 | F8 | 8.7 |

EXAMPLE 5

According to the same procedures as those described in Example 1, an uncured composition B comprising a nitrile group-containing polymer rubber and a phosphonium salt, shown in Table 13, and an uncured composition A shown in Table 14 were kneaded and test pieces were prepared therefrom to mesure the peel strength. The obtained results are shown in Table 15.

From the results shown in Table 15, it is evident that, when a specific phosphonium salt is incorporated in an amount of at least 1.0 part by weight into a nitrile group-containing polymer rubber and a metal oxide is incorporated in a fluororubber, a rubber laminate in which the nitrile group-containing polymer rubber is cure-bonded firmly to the fluororubber can be obtained.

TABLE 13

| | Sample | | | |
|---|---|---|---|---|
| Recipe (parts by weight) | N24 | N25 | N26 | N27 |
| H—NBR*[1] | 100 | 100 | 100 | 100 |
| zinc oxide | 5 | 5 | 5 | 5 |
| stearic acid | 1 | 1 | 1 | 1 |
| carbon black (FEF) | 40 | 40 | 40 | 40 |
| plasticizer (TP-95)*[2] | 5 | 5 | 5 | 5 |
| tetrabutylphosphonium benzotriazolate | 0 | 1.0 | 2.0 | 3.0 |
| sulfur | 0.5 | 0.5 | 0.5 | 0.5 |
| curing promoter TT | 2.0 | 2.0 | 2.0 | 2.0 |
| curing promoter CZ | 1.0 | 1.0 | 1.0 | 1.0 |

Notes:
*[1]Zetpol 2020 (supplied by Nippon Zeon)
*[2]di(butoxyethoxyethyl)adipate (supplied by Morton Thiokol Co., Chemical Division, U.S.A.)

TABLE 14

| Recipe (parts by weight) | Sample F9 |
|---|---|
| fluororubber*[1] | 100 |
| magnesium oxide | 3 |
| calcium hydroxide | 6 |
| carbon black | 20 |

Note:
*[1]Tecnoflon FOR45 (supplied by Montefluos, Italy)

TABLE 15

| | Combination of Uncured Compositions | | Peel Strength |
|---|---|---|---|
| | B | A | (kg/inch) |
| Comparative Example | N24 | F9 | not bonded |
| Example | N25 | F9 | 4.4 |
| | N26 | F9 | 8.5 |
| | N27 | F9 | 8.9 |

We claim:

1. A rubber laminate prepared by preparation of rubber contacting an uncured composition A comprising a fluororubber and a metal oxide with an uncured composition B comprising a nitrile group-containing polymer rubber and a phosphonium salt represented by the following general formula:

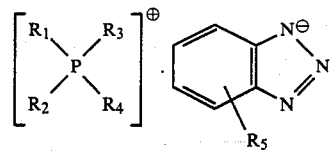

wherein $R_1$, $R_2$, $R_3$ and $R_4$ each stand for a hydrocarbon residue having 1 to 20 carbon atoms, which may be substituted, with the proviso that up to three of $R_1$, $R_2$, $R_3$ and $R_4$ may be a primary, secondary or tertiary amino group or a fluoroalkyl group, and $R_5$ stands for a hydrogen atom or an alkyl group having 1 to 20 carbon atoms, and curing the uncured compositions.

2. A rubber laminate according to claim 1, wherein the fluororubber is a rubber selected from the group consisting of homopolymer rubbers of fluorine-containing unsaturated monomers, copolymer rubbers of fluorine-containing unsaturated monomers and copolymer rubbers of fluorine-containing unsaturated monomers with other unsaturated monomers copolymerizable therewith.

3. A rubber laminate according to claim 1, wherein the fluororubber is a rubber selected from the group consisting of vinylidene fluoride/hexafluoropropene binary copolymer rubbers and vinylidene fluoride/hexafluoropropene/ tetrafluoroethylene terpolymers.

4. A rubber laminate according to claim 1, wherein the metal oxide is a compound selected from the group consisting of CaO, MgO, PbO, $Pb_3O_4$, BaO and $Al_2O_3$.

5. A rubber laminate according to claim 1, wherein the metal oxide is MgO.

6. A rubber laminate according to claim 1, wherein the metal oxide is incorporated in the uncured composition A in an amount of 1 to 30 parts by weight per 100 parts by weight of the fluororubber.

7. A rubber laminate according to claim 1, wherein the phosphonium salt is further incorporated in the fluororubber.

8. A rubber laminate according to claim 1, wherein the nitrile group-containing polymer rubber is a rubber selected from the group consisting of unsaturated nitrile/ conjugated diene copolymer rubbers, unsaturated nitrile/ conjugated diene/ethylenically unsaturated monomer terpolymer rubbers and unsaturated nitrile/ethylenically unsaturated copolymer rubbers.

9. A rubber laminate according to claim 1, wherein the nitrile group-containing polymer rubber is a nitrile group-containing, highly saturated polymer rubber having an iodine value smaller than 120.

10. A rubber laminate according to claim 9, wherein the nitrile group-containing, highly saturated polymer rubber is a copolymer rubber selected from the group consisting of a copolymer rubber formed by hydrogenating conjugated diene units of an unsaturated nitrile/conjugated diene copolymer rubber, an unsaturated nitrile/conjugated diene/ ethylenically unsaturated monomer terpolymer rubber, a copolymer rubber formed by hydrogenating conjugated diene units of said terpolymer rubber and an unsaturated nitrile/ethylenically unsaturated monomer copolymer rubber.

11. A rubber laminate according to claim 1, wherein the hydrocarbon residue is a group selected from the group consisting of alkyl groups, cycloalkyl groups, aralkyl groups, aryl groups and substituted aryl groups.

12. A rubber laminate according to claim 1, wherein the phosphonium salt is incorporated in the incured composition B in an amount of 1 to 10 parts by weight per 100 parts by weight of the nitrile group-containing copolymer rubber.

* * * * *